United States Patent
Abraham et al.

(10) Patent No.: US 8,294,612 B2
(45) Date of Patent: *Oct. 23, 2012

(54) METHOD AND SYSTEM FOR RF INTERFERENCE MITIGATION USING A BLANKING WATCHGUARD

(75) Inventors: Charles Abraham, Los Gatos, CA (US); Kambiz Shoarinejad, Tustin, CA (US); Jared Welz, Seal Beach, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/206,341

(22) Filed: Aug. 9, 2011

(65) Prior Publication Data
US 2011/0291888 A1    Dec. 1, 2011

Related U.S. Application Data

(63) Continuation of application No. 12/573,952, filed on Oct. 6, 2009, now Pat. No. 7,994,975.

(51) Int. Cl.
*G01S 19/21* (2010.01)
*G01S 19/24* (2010.01)

(52) U.S. Cl. .................. 342/357.59; 342/357.63

(58) Field of Classification Search ............. 342/357.59, 342/357.63
See application file for complete search history.

(56) References Cited

U.S. PATENT DOCUMENTS 6,421,077 B1 * 7/2002 Reed, Jr. ................... 348/21
7,313,086 B2 * 12/2007 Aizawa ..................... 370/208

* cited by examiner

*Primary Examiner* — Jack W Keith
*Assistant Examiner* — Cassie Galt
(74) *Attorney, Agent, or Firm* — Sterne, Kessler, Goldstein & Fox P.L.L.C.

(57) ABSTRACT

A global navigation satellite system (GNSS) enabled mobile device may be operable to assert one of autoblank signals when RF interference is detected in received GNSS signals for one of consecutive first time windows. The asserted autoblank signals are monitored by the GNSS enabled mobile device over time intervals corresponding to consecutive second time windows and a rate at which the autoblank signals are asserted for each of the consecutive second time windows is determined by the GNSS enabled mobile device based on the monitoring. The GNSS enabled mobile device may be operable to determine whether to blank processing of the received GNSS signals based on the determined rate. The autoblank signals may be asserted by the GNSS enabled mobile device based on a number of the received GNSS signals whose absolute signal levels exceed a signal level threshold for the first time window.

20 Claims, 6 Drawing Sheets

METHOD AND SYSTEM FOR RF INTERFERENCE MITIGATION USING A BLANKING WATCHGUARD

CROSS-REFERENCE TO RELATED APPLICATIONS/INCORPORATION BY REFERENCE

This application is a continuation of U.S. Application Ser. No. 12/573,952 filed Oct. 6, 2009.

FIELD OF THE INVENTION

Certain embodiments of the invention relate to wireless communication. More specifically, certain embodiments of the invention relate to a method and system for RF interference mitigation using a blanking watchguard.

BACKGROUND OF THE INVENTION

The global positioning system (GPS), the global orbiting navigation satellite system (GLONASS), and the satellite navigation system GALILEO are examples of global navigation satellite systems (GNSS). A GNSS utilizes an earth-orbiting constellation of a plurality of satellites each broadcasting GNSS signals which indicates its precise location and ranging information. From particular locations on or near the earth, GNSS receivers may detect valid GNSS signals using a temperature compensated crystal oscillator (TCXO) and take various GNSS measurements such as pseudorange, carrier phase, and/or Doppler to calculate navigation information such as GNSS receiver positions, velocity, and time.

The GNSS receivers may be integrated within or externally coupled to mobile devices for exemplary navigation applications comprising E911, location-based 411, location-based messaging. The mobile devices may provide connections to access applications such as route tracking, multimedia communication, song downloading, instant messaging, making phone call, and/or mobile television (TV). In mobile devices there may be multiple sources of RF interference. Such interference may be present in a GNSS band and may result from unintentional sources, such as TV/FM harmonics, radar, MSS, or may result from hostile (jamming) efforts. Some interference sources are continuous, such as WCDMA transmissions or spurious emissions from other circuits, while others are pulse (burst), such as GSM or EDGE transmissions.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for RF interference mitigation using a blanking watchguard, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention can be found in a method and system for RF interference mitigation using a blanking watchguard. In various embodiments of the invention, a global navigation satellite system (GNSS) enabled mobile device may be operable to determine a rate at which autoblank signals are asserted. The autoblank signals may be asserted during the RF interference mitigation process using autoblanking. The GNSS enabled mobile device may be operable to control the processing of received GNSS signals based on the determined rate of asserted autoblank signals. In this regard, the GNSS enabled mobile device may be operable to monitor the autoblank signals over time intervals corresponding to consecutive time windows. The GNSS enabled mobile device may be operable to determine a count of the autoblank signals that are received during the time interval corresponding to the time window. The GNSS enabled mobile device may be operable to compare the determined count to a count threshold. In this regard, the count may be, for example, a percentage of time within the time window when the autoblank signals are received, and the count threshold may be a particular percentage of time. The count may also be, for example, a total number of the autoblank signals received during the time window, and the count threshold may be a particular number of the autoblank signals. The GNSS enabled mobile device may be operable to disable the generation of a blank signal when the count is greater than the count threshold at the end of the time window. The GNSS enabled mobile device may be operable to enable the generation of a blank signal when the count is less than or equal to the count threshold at the end of the time window, and the blank signal is used to blank the processing of received GNSS signals. The GNSS enabled mobile device may be operable to disable the generation of a blank signal when the count is greater than the count threshold at a time, for example, prior to the end of the time window. The GNSS enabled mobile device may be operable to enable the generation of a blank signal when the count is less than or equal to the count threshold at a time, for example, prior to the end of the time window, and the blank signal is used to blank the processing of received GNSS signals.

Figure 1:
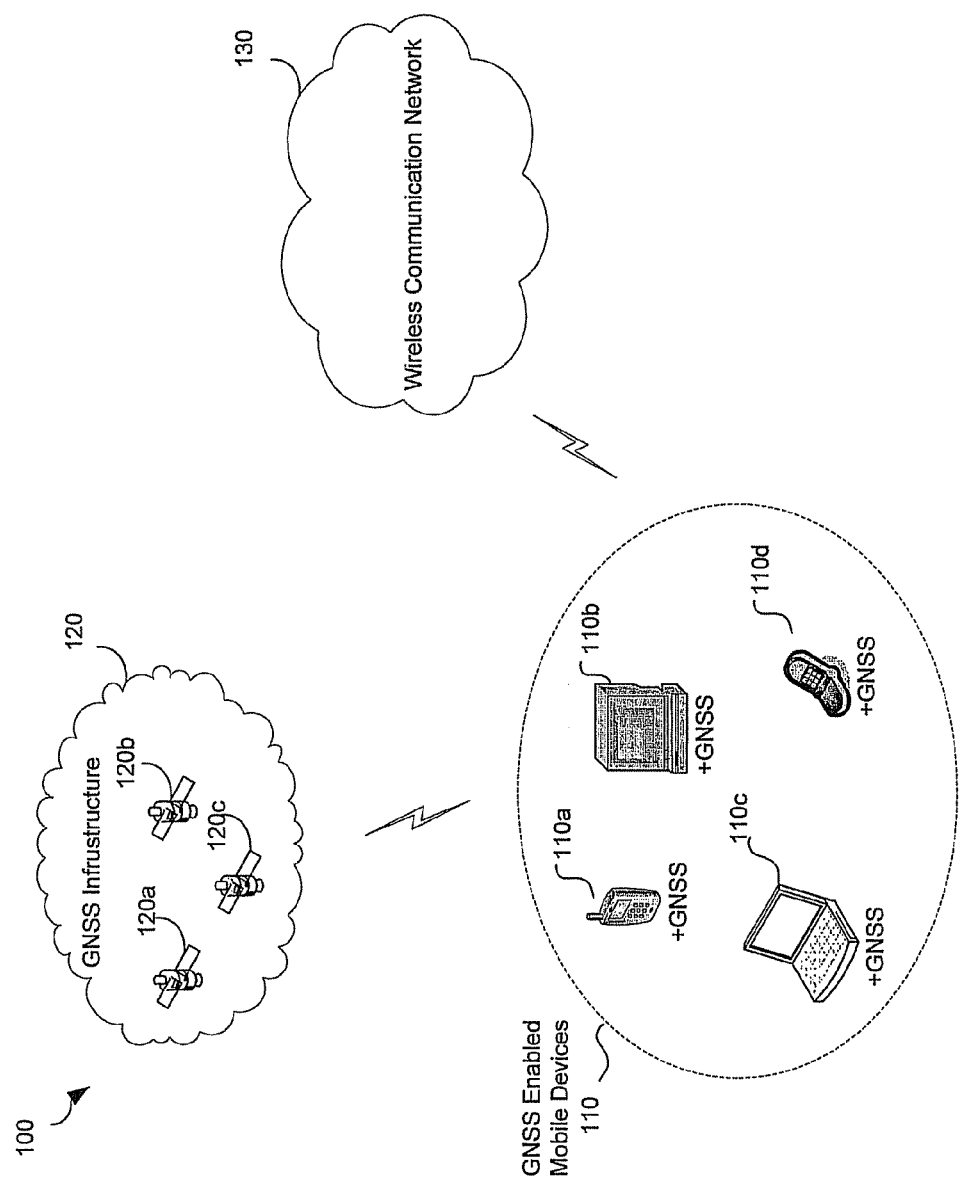
FIG. 1 is a diagram illustrating an exemplary communication system that is operable to provide RF interference mitigation using a blanking watchguard, in accordance with an embodiment of the invention.

FIG. 1 is a diagram illustrating an exemplary communication system that is operable to provide RF interference mitigation using a blanking watchguard, in accordance with an embodiment of the invention. Referring to FIG. 1, there is shown a communication system 100. The communication system comprises a plurality of GNSS enabled mobile devices 110, of which GNSS enabled mobile devices 110a-110d are illustrated, a GNSS infrastructure 120, a wireless communication network 130. The GNSS infrastructure 120 comprises a plurality of GNSS satellites such as GNSS satellites 120a through 120c.

A GNSS enabled mobile device such as the GNSS enabled mobile device 110a may comprise suitable logic, circuitry, interfaces and/or code that are operable to communicate radio signals across the wireless communication network 130. The GNSS enabled mobile device 110a may be operable to receive GNSS broadcast signals from a plurality of visible GNSS satellites such as GNSS satellites 120a through 120c in the GNSS infrastructure 120. The received GNSS signals may be utilized to determine navigation information such as a position fix and/or a velocity of the GNSS enabled mobile device 110a. The determined navigation information such as a position fix of the GNSS enabled mobile device 110a may be communicated with, for example, the wireless communication network 130, for various navigation applications such as E911, location-based 411, location-based messaging, etc.

The GNSS signals that are received by the GNSS enabled mobile device 110a may comprise RF interference. In some instances when the RF interference level is high, the RF interference may almost wipe out the GNSS signal to the point where it may be better not to process the GNSS signal (blank the GNSS signal processing) during that time using a RF interference mitigation method, such as, for example, the autoblanking method. Some RF interference occurs continuously such as in WCDMA transmissions (continuous jammer) in the wireless communication network 130 and some RF interference occurs for a short burst of time such as in GSM or EDGE transmissions (burst jammer) in the wireless communication network 130. In instances when the RF interference is a continuous jammer, the autoblank signals asserted using autoblanking may not be stopped for a long time or may never be stopped during the RF interference mitigation process. In this regard, the GNSS enabled mobile device 110a may be operable to perform the RF interference mitigation using autoblanking and blank monitoring with watchguard. During the RF interference mitigation process, the GNSS enabled mobile device 110a may be operable to assert autoblank signals using autoblanking. The GNSS enabled mobile device 110a may be operable to monitor and determine the rate of the autoblank signals and control the blanking of processing of received GNSS signals based on the rate of the autoblank signals. In instances when it is determined that the rate of the autoblank signals is too high, for example, the rate exceeds a particular rate threshold, the GNSS enabled mobile device 110a may be operable to disable or stop the blanking of processing of received GNSS signals.

A GNSS satellite such as the GNSS satellite 120a may comprise suitable logic, circuitry, interfaces and/or code that is operable to provide satellite navigational information to various GNSS receivers on earth. In an embodiment of the invention, the GNSS receivers, such as GPS, GALILEO or GLONASS receivers, may be integrated within GNSS capable mobile devices such as the GNSS enabled mobile devices 110a through 110d.

The wireless communication network 130 may comprise suitable logic, circuitry, interfaces and/or code that may be operable to provide voice and data services to various mobile devices such as the GNSS enabled mobile devices 110a-110d by using wireless communication technologies such as, for example, WCDMA, GSM, GPRS, UMTS, EDGE, EGPRS, LTE, WiMAX, WiFi, and/or Bluetooth.

In operation, a GNSS enabled mobile device such as the GNSS enabled mobile device 110a may be operable to detect and receive GNSS signals from, for example, the GNSS satellites 120a-120c. The GNSS enabled mobile device 110a may be operable to perform the RF interference mitigation using autoblanking and blank monitoring with watchguard. During the RF interference mitigation process, the GNSS enabled mobile device 110a may be operable to assert autoblank signals using autoblanking. The GNSS enabled mobile device 110a may be operable to monitor and determine the rate of the autoblank signals and control the blanking of processing of received GNSS signals based on the rate of the autoblank signals. In instances when it is determined that the rate of autoblank signals is too high, for example, the rate exceeds a particular rate threshold, the GNSS enabled mobile device 110a may be operable to disable or stop the blanking of processing of received GNSS signals.

Figure 2:
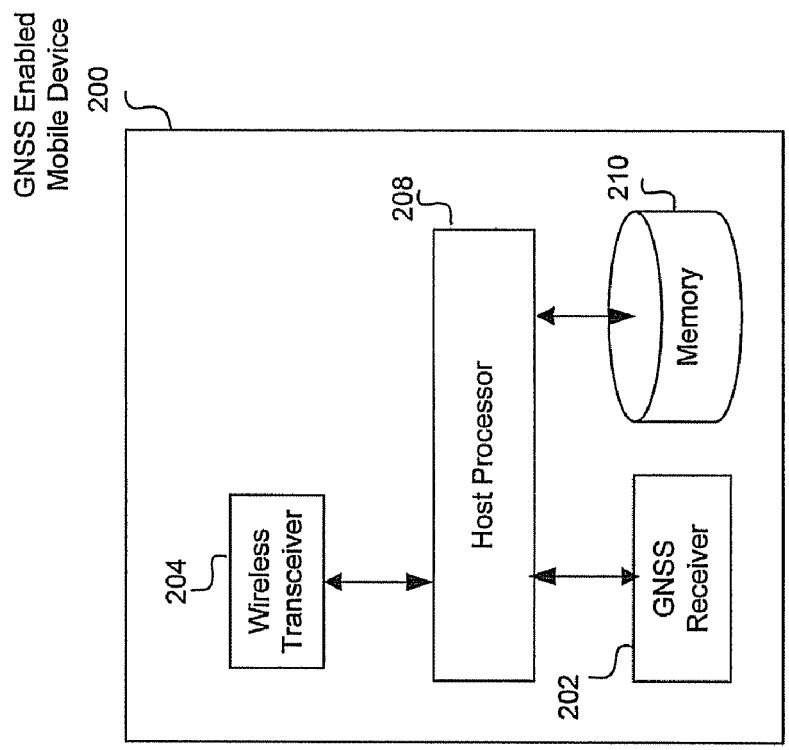
FIG. 2 is a block diagram illustrating an exemplary GNSS enabled mobile device that is operable to provide RF interference mitigation using a blanking watchguard, in accordance with an embodiment of the invention.

FIG. 2 is a block diagram illustrating an exemplary GNSS enabled mobile device that is operable to provide RF interference mitigation using a blanking watchguard, in accordance with an embodiment of the invention. Referring to FIG. 2, there is shown a GNSS enabled mobile device 200. The GNSS enabled mobile device 200 may comprise a GNSS receiver 202, a wireless transceiver 204, a host processor 208, and a memory 210.

The GNSS receiver 202 may comprise suitable logic, circuitry, interfaces and/or code that may be operable to detect and receive GNSS signals from a plurality of visible GNSS satellites 120a-120c. The GNSS receiver 202 may be operable to utilize the received GNSS signals to calculate navigation information such as a position fix and/or velocity of the GNSS receiver 202. The calculated navigation information may be provided to the host processor 208 to be communicated with the wireless communication network 130 for various navigation applications such as, for example, location-based 411. The GNSS receiver 202 may be operable to perform RF interference mitigation using autoblanking and blank monitoring with watchguard. During the RF interference mitigation process, the GNSS receiver 202 may be operable to assert autoblank signals using autoblanking. The GNSS receiver 202 may be operable to monitor and determine the rate of the autoblank signals and control the blanking of processing of received GNSS signals based on the rate of the autoblank signals. In instances when it is determined that the rate of autoblank signals is too high, for example, the rate exceeds a particular rate threshold, the GNSS receiver 202 may be operable to disable or stop the blanking of processing of received GNSS signals.

The wireless transceiver 204 may comprise suitable logic, circuitry, interfaces and/or code that may be operable to communicate radio signals over the wireless communication network 130.

The host processor 208 may comprise suitable logic, circuitry, interfaces and/or code that may be operable to process signals from the GNSS receiver 202 and the wireless transceiver 204. The host processor 208 may be operable to communicate signals with the wireless communication network 130 via the wireless transceiver 204. The host processor 208 may be operable to communicate navigation information with the wireless communication network 130 for various navigation applications such as location-based 411 and/or roadside assistance.

The memory 210 may comprise suitable logic, circuitry, and/or code that operable to store information such as executable instructions and data that may be utilized by the host processor 208. The memory 210 may comprise RAM, ROM, low latency nonvolatile memory such as flash memory and/or other suitable electronic data storage.

In operation, the GNSS receiver 202 may be operable to receive GNSS signals from a plurality of visible GNSS satellites 120a-120c. The GNSS receiver 202 may be operable to perform RF interference mitigation using autoblanking and blank monitoring with watchguard. During the RF interference mitigation process, the GNSS receiver 202 may be operable to assert autoblank signals using autoblanking. The GNSS receiver 202 may be operable to monitor and determine the rate of the autoblank signals. The GNSS receiver 202 may be operable to control the blanking of the received GNSS signals based on the determined rate of the autoblank signals. In instances when it is determined that the rate of autoblank signals is too high, for example, the rate exceeds a particular rate threshold, the GNSS receiver 202 may be operable to disable or stop the blanking of processing of received GNSS signals.

Figure 3:
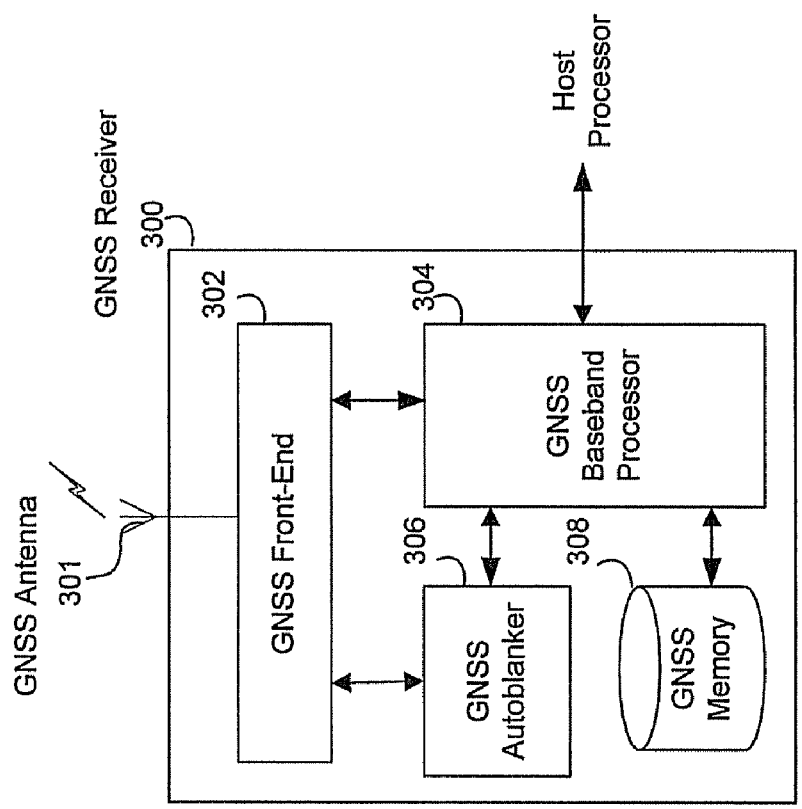
FIG. 3 is a block diagram illustrating an exemplary GNSS receiver that is operable to provide RF interference mitigation using a blanking watchguard, in accordance with an embodiment of the invention.

FIG. 3 is a block diagram illustrating an exemplary GNSS receiver that is operable to provide RF interference mitigation using a blanking watchguard, in accordance with an embodiment of the invention. Referring to FIG. 3, there is shown a GNSS receiver 300. The GNSS receiver 300 may comprise a GNSS antenna 301, a GNSS front-end 302, a GNSS processor 304, a GNSS autoblanker 306, and a GNSS memory 308.

The GNSS antenna 301 may comprise suitable logic, circuitry, interfaces and/or code that may be operable to receive GNSS signals from a plurality of visible GNSS satellites such as the GNSS satellites 120a through 120c. The GNSS antenna 301 may be operable to communicate the received GNSS signals to the GNSS front-end 302 for further processing.

The GNSS front-end 302 may comprise suitable logic, circuitry, interfaces and/or code that may be operable to convert the received GNSS signals to GNSS baseband signals, which may be suitable for further processing in the GNSS baseband processor 304 and in the GNSS autoblanker 306. The GNSS front-end 302 may be operable to detect and track GNSS signals.

The GNSS baseband processor 304 may comprise suitable logic, circuitry, interfaces and/or code that may be operable to process GNSS baseband signals from the GNSS front-end 302 to extract the information and data bits conveyed in the received GNSS signals. The GNSS baseband processor 304 may be operable to perform functions such as clock recovery, channel selection, demodulation, and/or decoding. The GNSS baseband processor 304 may be operable to calculate navigation information such as a position fix using the GNSS baseband signals from the GNSS front-end 302. The GNSS baseband processor 304 may be operable to communicate the calculated navigation information with the host processor 208 for various navigation applications such as E911 supported by the wireless communication network 130. The GNSS baseband processor 304 may be operable to process blanking signals from the GNSS autoblanker 306. Instances when the GNSS baseband processor 304 receives blanking signals from the GNSS autoblanker 306, the GNSS baseband processor 304 may be operable to stop the processing of received GNSS signals until the blanking signals stop.

The GNSS autoblanker 306 may comprise suitable logic, circuitry, interfaces and/or code that may be operable to receive signals from the GNSS front-end 302 and perform RF interference mitigation using autoblanking and blank monitoring with watchguard. During the RF interference mitigation process, the GNSS autoblanker 306 may be operable to assert autoblank signals using autoblanking. The GNSS autoblanker 306 may be operable to monitor and determine the rate of the autoblank signals and control the blanking of processing of received GNSS signals based on the rate of the autoblank signals. In instances when it is determined that the rate of autoblank signals is too high, for example, the rate exceeds a particular rate threshold, the GNSS autoblanker 306 may be operable to disable or stop the blanking of processing of received GNSS signals. The GNSS autoblanker 306 may be operable to communicate blanking signals with the GNSS baseband processor 304 for further processing.

The GNSS memory 308 may comprise suitable logic, circuitry, interfaces and/or code that may enable storage of information such as executable instructions and data that may be utilized by the GNSS baseband processor 304. The executable instructions may be utilized to calculate a position fix of the GNSS receiver 300 using GNSS measurements. The data may comprise the determined position fix of the GNSS receiver 300. The GNSS memory 308 may comprise RAM, ROM, low latency nonvolatile memory such as flash memory and/or other suitable electronic data storage.

In operation, the GNSS antenna 301 may be operable to receive GNSS signals for GNSS measurements. The GNSS front-end 302 may be operable to process the received GNSS signals and convert into GNSS baseband signals. The converted GNSS baseband signals may be communicated with the GNSS baseband processor 304 for GNSS baseband processing. The processed GNSS baseband signals may be used to calculate a position fix of the GNSS receiver 300. The calculated position fix may be forward to the host processor 210 for a navigation application. The GNSS autoblanker 306 may be operable to receive signals from the GNSS front-end 302 and perform RF interference mitigation using autoblanking and blank monitoring with watchguard. During the RF interference mitigation process, the GNSS autoblanker 306 may be operable to assert autoblank signals using autoblanking. The GNSS autoblanker 306 may be operable to monitor and determine the rate of the autoblank signals. The GNSS autoblanker 306 may be operable to control the blanking of processing of the received GNSS signals based on the determined rate of the autoblank signals. In instances when it is determined that the rate of autoblank signals is too high, for example, the rate exceeds a particular rate threshold, the GNSS autoblanker 306 may be operable to disable or stop the blanking of processing of received GNSS signals. The GNSS autoblanker 306 may be operable to communicate blanking signals with the GNSS baseband processor 304 for further processing. In instances when the GNSS baseband processor 304 receives the blanking signals from the GNSS autoblanker 306, the GNSS baseband processor 304 may be operable to stop the processing of received GNSS signals until the blanking signals stop.

Figure 4:
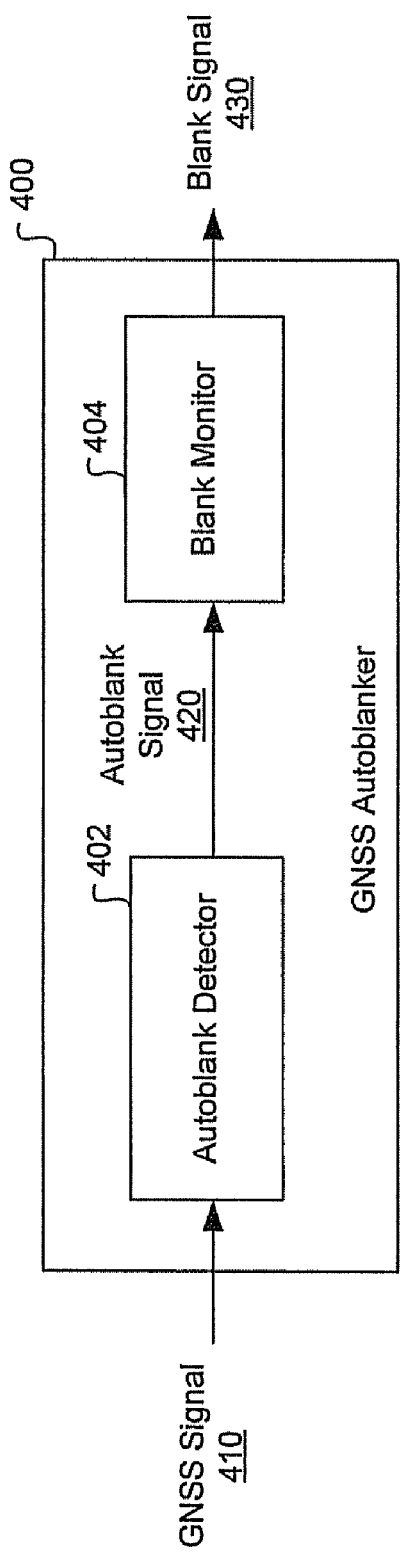
FIG. 4 is a block diagram illustrating an exemplary GNSS autoblanker that is operable to provide RF interference mitigation using a blanking watchguard, in accordance with an embodiment of the invention.

FIG. 4 is a block diagram illustrating an exemplary GNSS autoblanker that is operable to provide RF interference mitigation using a blanking watchguard, in accordance with an embodiment of the invention. Referring to FIG. 4, there is shown a GNSS autoblanker 400. The GNSS autoblanker 400 may comprise an autoblank detector 402, a blank monitor 404, a GNSS signal 410, an autoblank signal 420, and a blank signal 430.

The autoblank detector 402 may comprise suitable logic, circuitry, interfaces and/or code that may be operable to receive a GNSS signal 410 from, for example, an ADC converter in the GNSS front-end 302 described with respect to FIG. 3, detect the level of RF interference and assert an autoblank signal 420 during a RF interference mitigation process. If the RF interference level is high, it may almost wipe out the GNSS signal 410 to the point where it may be better not to process the GNSS signal 410 (blank the GNSS signal processing) during that time using a RF interference mitigation method, such as, for example, the autoblanking method implemented by the autoblank detector 410. In an exemplary embodiment of the invention, the autoblank detector 402 may be operable to establish consecutive time windows namely, for example, detector time windows for detecting the received GNSS signal 410 for RF interference level. The autoblank detector 402 may establish a signal level threshold as a reference for signal levels of received GNSS signals 410. During the time within the detector time window, the number of received GNSS signals 410 whose absolute signal levels exceed the signal level threshold may be computed. The autoblank detector 402 may establish another threshold, namely, for example, a signal number threshold as a reference for above mentioned number of received GNSS signals 410 whose absolute signal levels exceed the signal level threshold. The autoblank detector 402 may be operable to assert an autoblank signal 420 if the number of received GNSS signals 410 whose absolute signal levels exceed the signal level threshold exceeds the signal number threshold.

The blank monitor 404 may comprise suitable logic, circuitry, interfaces and/or code that may be operable to receive an autoblank signal 420 which may be asserted by the autoblank detector 402, monitor the received autoblank signals 420 and determine whether a blank signal 430 may be generated or enabled based on the result of the monitoring of received autoblank signals 420. An autoblank signal 420 may be asserted in instances when RF interference is detected. Some RF interference is on continuously such as in WCDMA transmissions (continuous jammer) and some RF interference is on only for a burst of time such as in GSM or EDGE transmissions (burst jammer). In instances when the RF interference is a burst jammer, an autoblank signal 420 may be stopped as soon as the RF interference may go away and the RF interference mitigation process may be stopped. On the other hand, in instances when the RF interference is a continuous jammer, an autoblank signal 420 may not be stopped for a long time or may never be stopped during a RF interference mitigation process.

A blanking watchguard process may be implemented by the blank monitor 404. In an exemplary embodiment of the invention, the blank monitor 404 may be operable to establish consecutive time windows namely, for example monitor time windows. The monitor time window may be much longer than the detector time window used for autoblanking. A count may be computed based on the number of total autoblank signals 420 received during the time within the monitor time window. The blank monitor 404 may be operable to establish a threshold namely, for example, a count threshold as a reference for above mentioned count. In instances when the count exceeds the count threshold at the end of the monitor time window, the generation of a blank signal 430 may be disabled. In instances when the count does not exceed the count threshold at the end of the monitor time window, the generation of a blank signal 430 may be enabled. The blank signal 430, instead of the autoblank signal 420, may be used to blank the processing of GNSS signals 410, for example, to stop the correlation process performed in the GNSS baseband processor 304 described with respected to FIG. 3. The computed count may be a percentage of time within the monitor time window when one or more of autoblank signals 420 are received and the count threshold may be a particular percentage of time. The computed count may be the number of total autoblank signals 420 received during the time within the monitor time window and the count threshold may be a particular number of autoblank signals 420. In an embodiment of the invention, the generation of a blank signal 430 may be disabled or enabled at a time prior to the end of the monitor time window, for example, at the middle of the monitor time window.

In operation, the autoblank detector 402 may be operable to receive GNSS signals 410 during the RF interference mitigation process. During each of the consecutive detector time windows, the number of received GNSS signals 410 whose absolute signal levels exceed the signal level threshold may be computed. The autoblank detector 402 may be operable to assert an autoblank signal 420 if the number of received GNSS signals 410 whose absolute signal levels exceed the signal level threshold exceeds the signal number threshold. The blank monitor 404 may be operable to receive autoblank signals 420 which may be asserted by the autoblank detector 402. During each of the consecutive monitor time windows, a count, for example, the percentage of time within the monitor time window when one or more of autoblank signals 420 are received or the number of total autoblank signals 420 received during the time within the monitor time window may be computed. The blank monitor 404 may be operable to stop or disable the blank signals 430 in instances when the count exceeds the count threshold at the end or, for example, at the middle of the monitor time window. The blank monitor 404 may be operable to generate or enable the blank signals 430 in instances when the count does not exceed the count threshold at the end or at a time prior to the end of the monitor time window, for example, at the middle of the monitor time window.

Figure 5:
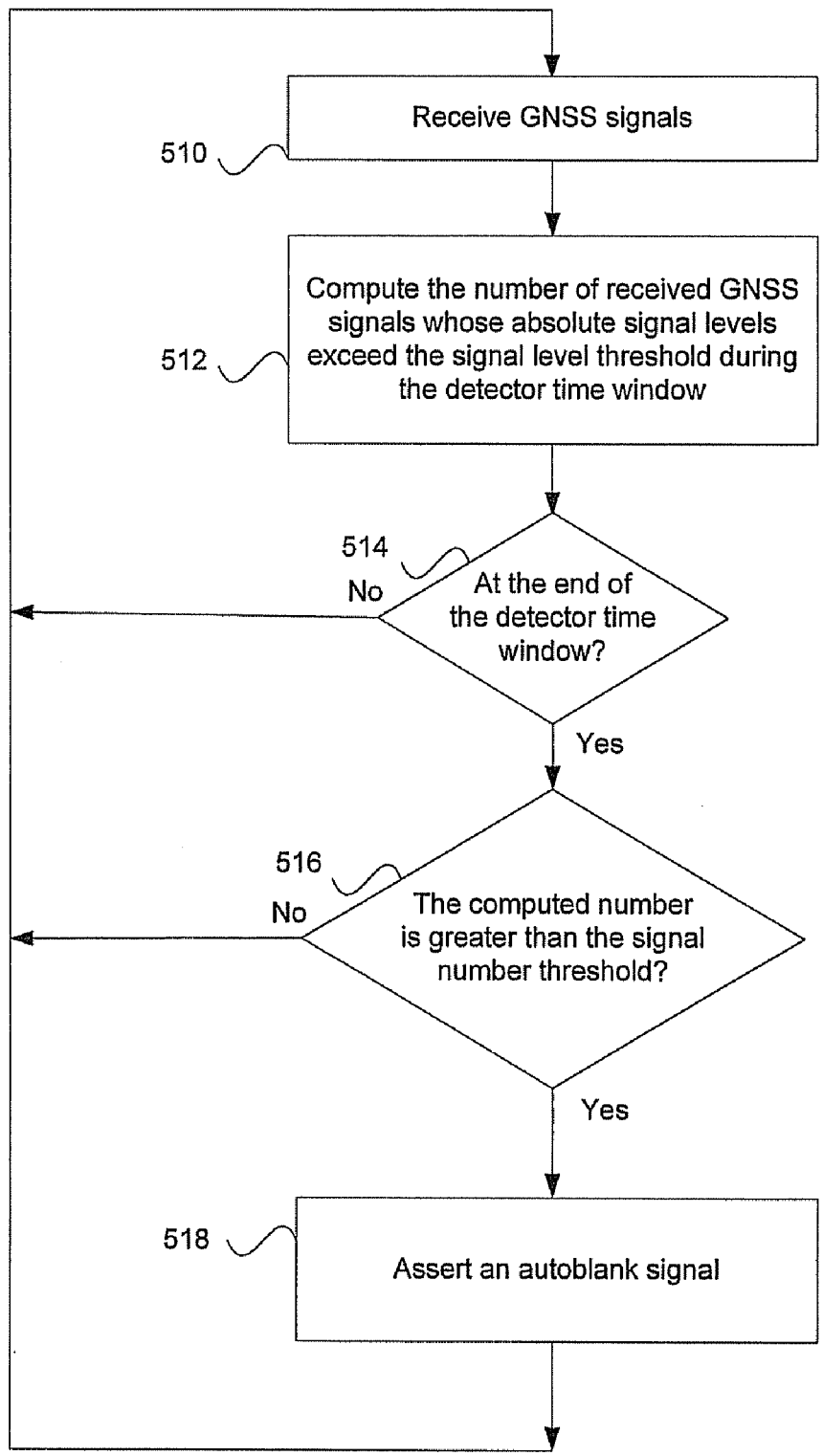
FIG. 5 is a flow chart illustrating exemplary steps for RF interference mitigation using autoblanking, in accordance with an embodiment of the invention.

FIG. 5 is a flow diagram illustrating exemplary steps for RF interference mitigation using autoblanking, in accordance with an embodiment of the invention. Referring to FIG. 5, the exemplary steps may start with step 510. In step 510, the autoblank detector 402 may be operable to receive GNSS signals. In step 512, the autoblank detector 402 may compute the number of received GNSS signals whose absolute signal levels exceed the signal level threshold during the detector time window. In step 514, the end of the detector time window is checked. In instances when the end of the detector time window is reached, the exemplary steps may proceed to step 516. In step 516, in instances when the computed number is greater than the signal number threshold, the exemplary steps may proceed to step 518. In step 518, the autoblank detector 402 may assert an autoblank signal and the exemplary steps may proceed to step 510. In step 514, in instances when the end of the detector time window is not reached, the exemplary steps may proceed to step 510. In step 516, in instances when the computed number is less than or equal to the signal number threshold, the exemplary steps may proceed to step 510.

Figure 6:
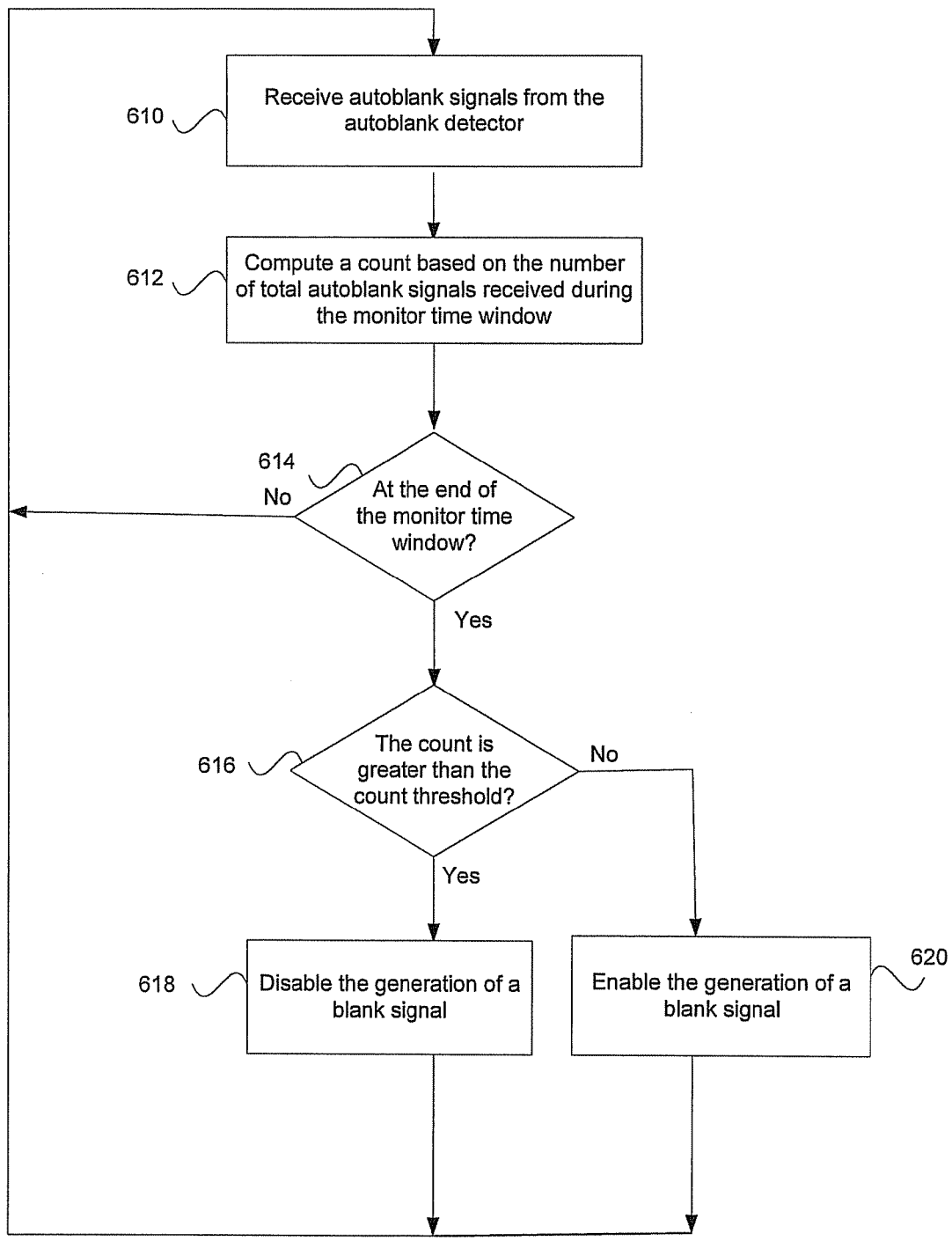
FIG. 6 is a flow chart illustrating exemplary steps for blanking watchguard during RF interference mitigation process, in accordance with an embodiment of the invention.

FIG. 6 is a flow diagram illustrating exemplary steps for blanking watchguard during RF interference mitigation process, in accordance with an embodiment of the invention. Referring to FIG. 6, the exemplary steps may start with step 610. In step 610, the blank monitor 404 may be operable to receive autoblank signals 420 from the autoblank detector 402. In step 612, the blank monitor 402 may compute a count based on the number of total autoblank signals 420 received during the monitor time window. In step 614, the end of the monitor time window is checked. In instances when the end of the monitor time window is reached, the exemplary steps may proceed to step 616. In step 616, in instances when the count is greater than the count threshold, the exemplary steps may proceed to step 618. In step 618, the blank monitor 404 may be operable to disable the generation of a blank signal 430 and exemplary steps may proceed to step 610. In step 614, in instances when the end of the monitor time window is not reached, the exemplary steps may proceed to step 610. In step 616, in instances when the count is less than or equal to the count threshold, the exemplary steps may proceed to step 620. In step 620, the blank monitor 404 may be operable to enable the generation of a blank signal and the exemplary steps may proceed to step 610.

In various embodiments of the invention, a global navigation satellite system (GNSS) enabled mobile device 200 may be operable to determine a rate at which autoblank signals 420 are asserted. The autoblank signals 420 may be asserted during the RF interference mitigation process using autoblanking. The GNSS enabled mobile device 200 may be operable to control the processing of received GNSS signals 410 based on the determined rate of asserted autoblank signals 420. In this regard, the GNSS enabled mobile device 200 may be operable to monitor the autoblank signals 420 over time intervals corresponding to consecutive time windows. The GNSS enabled mobile device 200 may be operable to determine a count of the autoblank signals 420 that are received during the time interval corresponding to the time window. The GNSS enabled mobile device 200 may be operable to compare the determined count to a count threshold. In this regard, the count may be, for example, a percentage of time within the time window when the autoblank signals 420 are received, and the count threshold may be a particular percentage of time. The count may also be, for example, a total number of the autoblank signals 420 received during the time window, and the count threshold may be a particular number of the autoblank signals 420. The GNSS enabled mobile device 200 may be operable to disable the generation of a blank signal 430 when the count is greater than the count threshold at the end of the time window. The GNSS enabled mobile device 200 may be operable to enable the generation of a blank signal 430 when the count is less than or equal to the count threshold at the end of the time window, and the blank signal 430 is used to blank the processing of received GNSS signals 410. The GNSS enabled mobile device 200 may be operable to disable the generation of a blank signal 430 when the count is greater than the count threshold at a time, for example, prior to the end of the time window. The GNSS enabled mobile device 200 may be operable to enable the generation of a blank signal 430 when the count is less than or equal to the count threshold at a time, for example, prior to the end of the time window, and the blank signal 430 is used to blank the processing of the received GNSS signals 410.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for RF interference mitigation using a blanking watchguard.

Accordingly, the present invention may be realized in hardware, software, or a combination of hardware and software. The present invention may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communication, the method comprising:
in a global navigation satellite system (GNSS) enabled mobile device:
asserting one of a plurality of autoblank signals when radio frequency (RF) interference is detected in received GNSS signals for a respective one of a plurality of consecutive first time windows;
monitoring said asserted autoblank signals over time intervals corresponding to a respective one of a plurality of consecutive second time windows;
determining a rate at which said autoblank signals are asserted for said respective one of said plurality of said consecutive second time windows based on said monitoring; and
determining whether to blank processing of said received GNSS signals based on said determined rate.

2. The method according to claim 1, comprising asserting said autoblank signals based on a number of said received GNSS signals whose absolute signal levels exceed a signal level threshold for said respective one of said plurality of consecutive first time windows.

3. The method according to claim 1, comprising determining a count of said autoblank signals that are received during said time interval corresponding to said respective one of said plurality of consecutive second time windows.

4. The method according to claim 3, comprising comparing said determined count to a count threshold.

5. The method according to claim 4, wherein said count comprises a percentage of time within said respective one of said plurality of consecutive second time windows when said autoblank signals are received, and said count threshold comprises a particular percentage of time.

6. The method according to claim 4, wherein said count comprises a total number of said autoblank signals received during said respective one of said plurality of consecutive second time windows, and said count threshold comprises a particular number of said autoblank signals.

7. The method according to claim 4, comprising disabling blanking of processing of said received GNSS signals when said count is greater than said count threshold at an end of said respective one of said plurality of consecutive second time windows.

8. The method according to claim 4, comprising enabling blanking of processing of said received GNSS signals when said count is less than or equal to said count threshold at an end of said respective one of said plurality of consecutive second time windows.

9. The method according to claim 4, comprising disabling blanking of processing of said received GNSS signals when said count is greater than said count threshold at a time prior to an end of said respective one of said plurality of consecutive second time windows.

10. The method according to claim 4, comprising enabling blanking of processing of said received GNSS signals when said count is less than or equal to said count threshold at a time prior to an end of said respective one of said plurality of consecutive second time windows.

11. A system for communication, the system comprising:
one or more processors and/or circuits for use in a global navigation satellite system (GNSS) enabled mobile device, said one or more processors and/or circuits being operable to:
assert one of a plurality of autoblank signals when radio frequency (RF) interference is detected in received GNSS signals for a respective one of a plurality of consecutive first time windows;
monitor said asserted autoblank signals over time intervals corresponding to a respective one of a plurality of consecutive second time windows;
determine a rate at which said autoblank signals are asserted for each of said respective one of said plurality of consecutive second time windows based on said monitoring; and
determine whether to blank processing of said received GNSS signals based on said determined rate.

12. The system according to claim 11, wherein said one or more processors and/or circuits are operable to assert said autoblank signals based on a number of said received GNSS signals whose absolute signal levels exceed a signal level threshold for said respective one of said plurality of consecutive first time windows.

13. The system according to claim 11, wherein said one or more processors and/or circuits are operable to determine a count of said autoblank signals that are received during said time interval corresponding to said respective one of said plurality of consecutive second time windows.

14. The system according to claim 13, wherein said one or more processors and/or circuits are operable to compare said determined count to a count threshold.

15. The system according to claim 14, wherein said count comprises a percentage of time within said respective one of said plurality of consecutive second time windows when said autoblank signals are received, and said count threshold comprises a particular percentage of time.

16. The system according to claim 14, wherein said one or more processors and/or circuits are operable to disable blanking of processing of said received GNSS signals when said count is greater than said count threshold at an end of said respective one of said plurality of consecutive second time windows.

17. The system according to claim 14, wherein said one or more processors and/or circuits are operable to enable blanking of processing of said received GNSS signals when said count is less than said count threshold at an end of said respective one of said plurality of consecutive second time windows.

18. The system according to claim 14, wherein said one or more processors and/or circuits are operable to disable blanking of processing of said received GNSS signals when said count is greater than said count threshold at a time prior to an end of said respective one of said plurality of consecutive second time windows.

19. The system according to claim 14, wherein said one or more processors and/or circuits are operable to enable blanking of processing of said received GNSS signals when said count is less than or equal to said count threshold at a time prior to an end of said respective one of said plurality of consecutive second time windows.

20. A method for communication, the method comprising:
in a global navigation satellite system (GNSS) enabled mobile device:
asserting one of a plurality of autoblank signals when radio frequency (RF) interference is detected in received GNSS signals for a respective one of a plurality of consecutive first time windows;
monitoring said asserted autoblank signals over time intervals corresponding to a respective one of a plurality of consecutive second time windows, wherein each of said plurality of consecutive second time windows is longer than each of said plurality of consecutive first time windows;
determining a rate at which said autoblank signals are asserted for said respective one of said plurality of said consecutive second time windows based on said monitoring; and
determining whether to blank processing of said received GNSS signals based on said determined rate.

* * * * *